United States Patent [19]
Pfoertner

[11] Patent Number: 6,106,755
[45] Date of Patent: Aug. 22, 2000

[54] METHOD OF MAKING A CAST URETHANE STRIKING TOOL

[76] Inventor: Rolf F. K. G. Pfoertner, 19613 - 56th Avenue, Langley, British Columbia, Canada, V3A 3X7

[21] Appl. No.: 08/925,687

[22] Filed: Sep. 9, 1997

Related U.S. Application Data

[60] Provisional application No. 60/025,634, Sep. 9, 1996, abandoned.

[51] Int. Cl.⁷ .............................. B29C 35/02; B29C 70/72
[52] U.S. Cl. .......................... 264/135; 264/254; 264/255; 264/275
[58] Field of Search ..................................... 264/250, 254, 264/255, 271.1, 275, 279.1, 135, 134; 145/29 R; 81/20, 22

[56] References Cited

U.S. PATENT DOCUMENTS

| | | | |
|---|---|---|---|
| 3,762,453 | 10/1973 | Merrow et al. ....................... | 264/271.1 |
| 3,844,321 | 10/1974 | Cook ..................................... | 145/29 R |
| 3,962,399 | 6/1976 | Shepherd, Jr. et al. ................ | 264/261 |
| 4,039,012 | 8/1977 | Cook ..................................... | 145/29 R |
| 4,180,542 | 12/1979 | Wrasman ................................ | 264/250 |
| 4,351,786 | 9/1982 | Mueller ................................. | 263/271.1 |
| 4,994,222 | 2/1991 | Iizumi et al. ........................... | 264/250 |
| 5,079,820 | 1/1992 | Mayerhofer ............................ | 264/252 |
| 5,262,113 | 11/1993 | Carmien ................................. | 264/257 |
| 5,408,902 | 4/1995 | Burnett ........................................ | 81/22 |
| 5,537,896 | 7/1996 | Halder ......................................... | 81/26 |
| 5,714,106 | 2/1998 | Yoda et al. ........................... | 264/271.1 |

*Primary Examiner*—Angela Oritz
*Attorney, Agent, or Firm*—Todd N. Hathaway

[57] ABSTRACT

A urethane hammer or other hand-held striking tool having a handle portion cast of a lower durometer, more flexible grade of urethane material, and a head portion which is cast around a metallic weight at the end of the handle portion. The flexible handle absorbs shocks, while the hard material of the head provides a durable, effective striking surface. The tool is cast using a two-stage process. In the first stage, the handle portion is cast with the metal weight located in its end. The handle portion is then placed in a second mold in which the weight on the end of the handle extends into a larger cavity corresponding to the head portion of the tool. The higher durometer urethane material is then cast in this cavity so as to encase the weight and the end of the handle portion.

13 Claims, 1 Drawing Sheet

METHOD OF MAKING A CAST URETHANE STRIKING TOOL

This application claims the benefit of U.S. provisional application No. 60/025,634, filed Sep. 9, 1996, which is now abandoned.

BACKGROUND

The transmission of shock forces from a hammer to the hand and forearm of the user is a common problem. For example, when a hammer is struck against an unyielding object with significant force, the shock to the user's hand can be quite severe. The problem is especially acute for persons who make regular use of hammers as part of their occupation, such as, for example mechanics who use large mallets or other hammers to break nuts/bolts or other fittings loose on heavy equipment.

A related problem occurs when the head of the hammer/mallet misses the object, and the impact is received at the shank of the handle. Not only does this result in a particularly severe shock to the user's hand, but the shank can fracture or break, in which case the separation of the head from the handle can present a serious safety hazard.

There have been attempts to provide a hammer having a handle which reduces the transmission of shocks to the user, but these have not been very satisfactory in practice. For example, fiberglass handles, although superior to traditional wood and steel in some respects, still transmit most of the shock directly to the hand grip. Moreover, although durable within limits, such handles are subject to the fractures/breakage problem discussed above. Still further, the use of separate materials—e.g., metal, fiberglass, rubber—for the head and other components means added costs in assembly.

Some success has also been achieved using hammers or mallets cast of urethane or similar materials. Such units, being formed of a non-metallic material, are especially valuable in electrical work because they are non-conductive, and also in flammable environments and explosive atmospheres due to their non-sparking nature. It has not been possible, however, to achieve a satisfactory balance between the competing requirements of the head and handle portions of the hammer when using this material. For example, if the material is sufficiently resilient for the shank of the handle to effectively absorb the impact loads, then the head of the hammer or mallet will be too soft to provide a satisfactory striking face or to have adequate service life; also, an excessively flexible handle tends to result in unacceptable, "floppy" handling characteristics. On the other hand, if the material has sufficiently high durometer to form a satisfactory head, the handle is too rigid to absorb the shock, and will also be subject to breaking.

Another difficulty with prior art cast urethane hammers/mallets has been to provide the head portion of the tool with sufficient weight/mass. Because of the low density which is characteristic of urethane and similar materials, it is necessary to augment the head with a denser metal core or weight if the hammer is to generate sufficient driving force. The metal weight must be located centrally in the head portion in order to provide the hammer/mallet with proper handling characteristics, but this has been difficult to achieve economically, due to the need for special struts or other supports to hold the metal core in the correct position within the mold while the unit is being cast.

Accordingly, there has existed a need for a hammer or mallet formed of a non-metallic material such as cast urethane, in which the head has sufficient hardness (or durometer) to provide a satisfactory striking surface, yet in which the handle portion has sufficient flexibility and resiliency to absorb and reduce the impact loads without transmitting these directly to the hand or arm of the user. Furthermore, there is a need for such a hammer or mallet in which the impact-absorbing handle provides sufficient stability to the head portion to ensure good handling characteristics during use. Still further, there is a need for such a hammer or mallet which can be constructed economically without the need for assembling several components made of different materials. Still further, there is a need for such a a hammer/mallet which can be cast of non-metallic material, with a central metallic core for adding weight to the head portion, but without requiring special struts or other supports for positioning the core within the mold during casting.

SUMMARY OF THE INVENTION

The present invention has solved the problems cited above, and is a urethane hammer, mallet, or similar striking tool having a handle portion which is formed of a lower durometer, more flexible grade of urethane material, and a head portion which is formed of a higher durometer, harder grade of the same material. The flexible handle portion thus absorbs shocks so as to avoid transmitting these directly to the user's hand and arm, while the hard material of the head provides a durable, effective striking surface.

The hammer of the present invention is cast in two stages. The handle portion is formed in the first stage, using a first mold in which there is a longitudinal cavity in the shape of the grip and shank portions of the handle, and a second, transverse cavity for holding a steel core or other metallic weight. The forward end of the longitudinal cavity extends around the cylindrical core in the transverse cavity, so as to form a collar portion for attaching the core to the handle portion when the latter is cast from the lower durometer urethane material.

After casting, the handle portion is removed from the first mold and placed in a second mold. The second mold has a longitudinal cavity which closely corresponds to that of the first mold, so that the at least partially cured handle portion of the hammer nests tightly therein. The forward end of the handle portion extends into a large transverse cavity which is configured to form the head portion of the hammer, so that the metal core is held centrally therein by the collar portion of the handle, without requiring any other supports. The head portion is then cast in the higher durometer urethane material so that this surrounds the steel core, forming a unitary structure with the handle portion. There is a taper at the base of the head portion where this meets the handle portion, so as to provide a smooth transition in flexibility at the joint between the head and handle portions of the hammer or mallet.

In broad terms, the present invention provides a hand-held striking tool comprising: (a) a handle portion formed of a first, lower durometer urethane material for reducing the transmission of shock forces to the grip area of the handle portion, (b) a weight member mounted to a first end of the handle portion for providing an increased mass at the first end of the handle portion, and (c) a head portion formed around the weight member at the first end of the handle portion, the head portion being formed of a second, higher durometer urethane material for providing the head portion with a hard, durable striking area. The handle portion of the striking tool may further comprise an elongate shank area connecting the grip area to the first end of the handle portion, and this may comprise a necked-down portion having a smaller cross-sectional area than the grip area for increased resilient flexibility. The necked-down portion of the handle portion preferably has a rectangular cross-section with flats formed at the corners, for enhanced stability in use.

The present invention also provides a method for forming the hand-held striking tool, which in broad terms comprises the steps of: (a) forming a handle portion of a first, lower durometer urethane material for reducing transmission of shock forces to a grip area of the handle portion, (b) mounting a weight member to a first end of the handle portion for providing an increased mass at the first end of the handle portion, and (c) forming a head portion around the weight member at the first end of the handle portion, the head portion being formed of a second, higher durometer urethane material for providing the head portion with a hard, durable striking area.

DETAILED DESCRIPTION a. Overview

Figure 1:
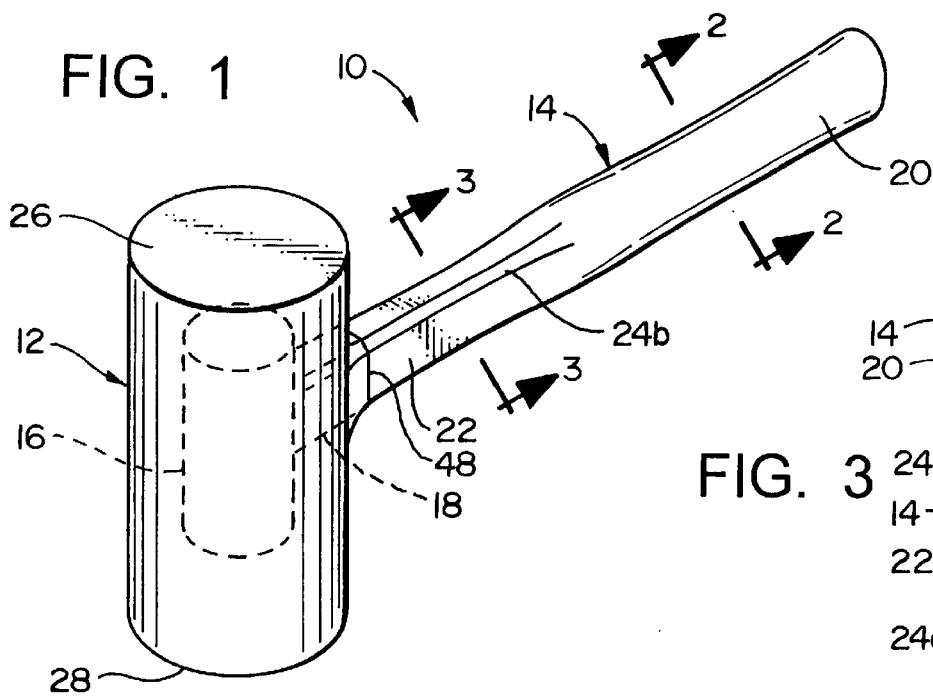
FIG. 1 is a perspective view of a cast urethane mallet in accordance with the present invention, in which the head portion is formed of a harder, higher-durometer grade of material to provide a satisfactory striking surface, and the handle portion is formed of a more resilient, lower durometer grade of the same material so as to effectively absorb impact loads.

FIG. 1 shows the mallet 10 in accordance with the present invention. The mallet 10 which is shown herein for purposes of illustration has a head portion with a generally cylindrical configuration, however, it will be understood that the head portion may be configured to have any suitable shape, such as that of a hammer or any other striking tool.

Mallet 10 comprises generally a head portion 12 and a handle portion 14. As will be described in greater detail below, the head portion is formed of a cast urethane material having a comparatively high durometer, so that this is able to provide a satisfactory striking surface for applying impact forces against a work piece, and also so that this will have a satisfactory working life. The handle portion, in turn, is formed of a second grade of the same or a compatible cast urethane material, this having a lower durometer and higher resilience so that it is able to absorb impact forces which are generated by the head portion of the tool.

In the manufacture of the tool, the handle portion 14 is cast first, with a steel or other metallic weight 16 being surrounded in the forward end 18 of the urethane handle portion. The head portion is then cast around the weight and forward end of the handle portion.

b. Structure

Figure 2:
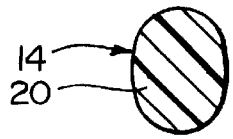
FIG. 2 is an end view of a cross-section taken transversely through the grip area of the handle portion of the mallet, along line 2—2 in FIG. 1.

Cast urethane material provides an effective degree of shock absorption and suitable resilience for use in the present invention. A comparatively soft urethane material, having a durometer of about A95 (equivalent to approximately D50), is suitable for the shock-absorbing handle portion of the tool. This can be formed by using a urethane elastomer having an isocyanate content of approximately 6.5%. The grip area 20 of the handle portion may have any suitable configuration which is convenient to be held by the operator, such as the oval cross-section which is shown in FIG. 2.

Figure 3:
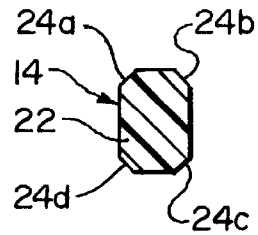
FIG. 3 is an end view of a cross-section taken transversely through the shank portion of the handle of the mallet, along line 3—3 in FIG. 1.

In order to achieve effective absorption of shock forces and also provide the head portion 12 with sufficient stability during use, the shank area 22 of the handle portion is necked down somewhat from the grip area 20 and is formed to have a more angular cross-section, as is shown in FIG. 3. In particular, as part of the present invention, it has been found that the desired stability can be achieved by forming the shank area 22 to have a generally rectangular, vertically elongate (e.g., elongate in a plane parallel to the plane in which the tool is swung in normal use) cross-section, with flats 24a–d being formed at each corner of the rectangle. The resultant configuration, as is shown in FIGS. 1 and 3 has been found to provide the head portion with far greater stability in use than is possible when using a shank portion having an oval or round cross-section; it is believed that this is the result of resistances to torsional forces which develop at the corners between the walls and flats in the angular shank area.

The head portion 12 is cast around the forward end of the handle portion as the second step in the fabrication process, so that the metallic core 16 at the end of the handle portion is centered within the head portion. By contrast with the handle portion, the head portion is cast of a grade of urethane material having a much higher durometer (i.e., greater rigidity), with a minimum durometer of about D72 being eminently suitable for the embodiment which is illustrated in the figures. A urethane elastomer having an isocyanate content at least 9.3% is suitable for this purpose.

Thus, the combination of two grades of the same or comparable urethane material, a high durometer for the head portion and a lower durometer for the handle portion, the present invention provides a cast, one piece hammer in which the head portion forms a satisfactory striking surface while the handle portion effectively absorbs the impact/shock loads which are generated at the head portion.

c. Molding Process

As was noted above, the hammer/mallet of the present invention is cast using a two-stage molding process. In the first stage, the handle portion is cast using the lower durometer urethane material, with the steel core being encased within the forward end thereof. In the second step, the head portion of the tool is cast around the steel core and forward end of the handle portion.

Figure 4:
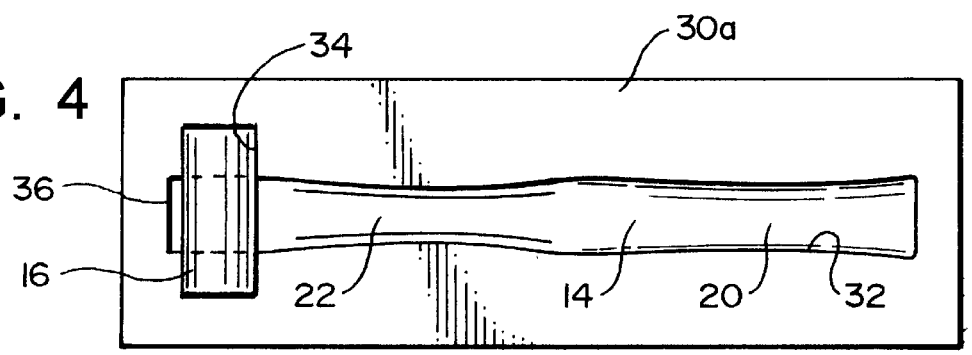
FIG. 4 is a plan view of the first mold for casting the handle portion of the mallet of FIG. 1, with the steel core being received in the forward end thereof.

FIG. 4 shows the first half 30a of the mold 30 (the other half 30b not being shown) which is used to cast the handle portion 14 of the hammer or mallet. The mold may suitably be formed of heat stable plastic. A first longitudinally-extending cavity 32 is formed in the mold, and which defines the grip and shape areas 22 as previously described. The forward end of the longitudinal cavity 32 terminates in an area located proximate to or somewhat forwardly of the vertical axis of the head portion in the finished article. A second cavity 34 extends across the forward end of the first cavity in this area, generally transverse to the lengthwise axis of the handle portion. The second cavity 34 is sized to receive a short, cylindrical, steel (or other metallic) core 16 or other weight. The forward end of the main handle cavity 32 extends radially (relative to the transverse axis) all around the transverse cavity 34, so as to form a collar area 36 which encircles the steel core 16 when the two mold halves 30*a*, 30*b* are brought together.

To cast the handle portion 14 of the hammer, the steel core is inserted placed in the cavity 34, and then the two mold halves 30*a*, 30*b* are brought together for filling with the first, lower durometer urethane material, which can be suitably accoplished using a gravity pour process. After this has set, the mold halves are separated, and the handle is removed, with the steel core being encircled by the collar portion 36 at its forward end. Although the secondary cavity in the mold extends transversely to the long axis of the handle in the embodiment which is illustrated, it will be understood that the secondary cavity for the weight can simply be an extension or continuous part of the primary cavity for the handle in some embodiments.

The at least partially cured handle portion 14 is then placed in a second mold 40 comprising mold halves 40*a*, 40*b* (only 40*a* being shown in the figures). The second mold has a longitudinal handle cavity 42 which closely matches the corresponding cavity 32 in the first mold 30, so that grip and shank areas of the handle nest tightly therein. Although the figures show a closed cavity, it will be understood that in some embodiments the area for the handle may be open-ended or truncated, so long as the handle is held firmly in place.

A large head cavity 44 extends transversely across the forward end of the longitudinal handle cavity 42 of the second mold. The forward end of the handle portion protrudes into this area, so that the steel core 16 is suspended approximately in the center of the large head cavity by the collar 36 at the end of the handle portion. Since the handle portion is held firmly within the first cavity 42, this eliminates the need for any dedicated rod, strut, or other support for positioning the steel core while the head is being cast.

Figure 5:
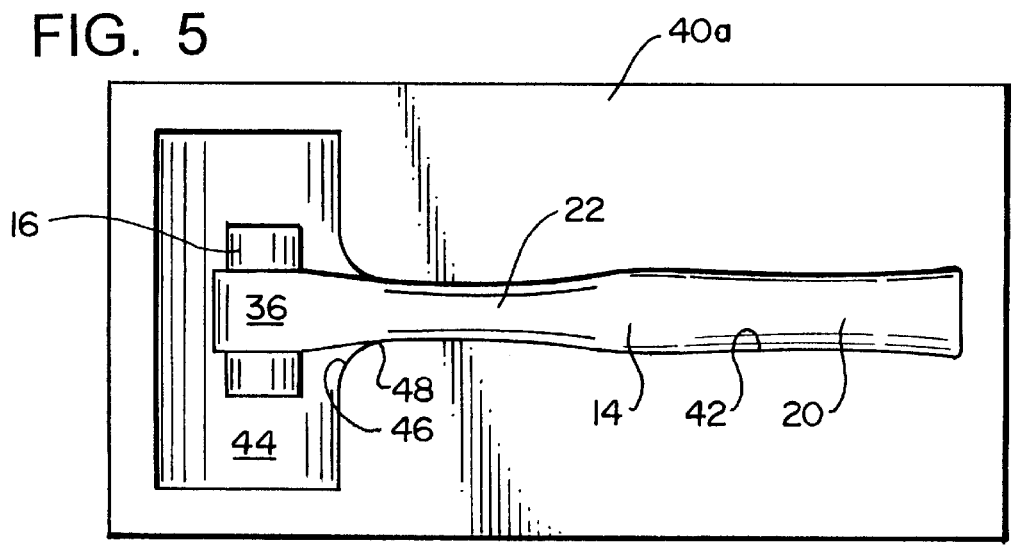
FIG. 5 is a plan view of the second mold in which the handle portion is laid for the casting of the head portion of the mallet, with the steel core being supported and positioned in the head portion of the mold by the forward end of the handle portion.

With the handle portion positioned as shown in FIG. 5, the two mold halves 40*a*, 40*b* are closed and the transverse head cavity 44 is filled with the high durometer urethane material, so that the harder material completely encases the steel core 16. The close-fitting handle cavity 42 prevents the harder urethane material from flowing up along the sides of the handle. However, at the base of the cavity 44 there is a neck area 46 which forms a smooth taper between the head and the shank area of the handle. Because of the decreasing thickness of the higher durometer material, down to edge 48, this configuration provides a smooth transition from greater to lesser rigidity in this area; in other words, the progressively thinner layer of high durometer material near the base edge 48 becomes progressively more flexible than the thicker areas where the taper opens out into the main body of the head. This improves the handling characteristics of the hammer/mallet (i.e., its "feel") and also its long term durability, since the smooth transition avoids concentration of stress forces and also helps prevent separation between the two grades of material. Furthermore, the adhesion between the two layers can be enhanced by appropriate surface treatment of the forward end of the shank area 22 where this extends into the head cavity (using, for example, a two-part urethane/curing agent chemical treatment available under the trademark "Thixon 412 from Whittaker, Inc. of West Alexandria, Ohio), or in some cases by selecting a partial rather than full cure time for the handle portion of the assembly before this is placed in the second mold.

Suitable urethane materials for forming the castings are available in resin form from many sources known to those skilled in the art, such as that available under the trademark "Adiprene" from Dupont Chemical Company.

Although the present invention has been described herein with regard to a preferred embodiment which is "all plastic" in that no metal surfaces are exposed, it will be understood that in some embodiments the striking faces on the head or other exterior parts of the tool may include pieces formed of various metals or other types of plastic.

It is to be recognized that various alterations, modifications, and/or additions may be introduced into the constructions and arrangements of parts described above without departing from the spirit or ambit of the present invention as defined by the appended claims.

What is claimed is:

1. A method for forming a hand-held striking tool having a metallic head weight which is entirely encased within cast urethane material, said method comprising the steps of:

placing said metallic head weight in an end of a first mold for forming a shank portion of said tool;

flowing a first, urethane material into said mold so as to form said shank portion, and so that said first urethane material flows into engagement with said metallic head weight;

at least partially curing said first urethane material so that said first urethane material attaches said head weight to an end of said shank portion;

placing said shank portion of said tool in a second mold having a cavity for forming a head portion of said tool, said second mold being configured to hold said shank portion at a spaced distance from said head weight so that said head weight is supported centrally in said cavity of said second mold by said at least partially cured urethane material of said shank portion without any other support; and flowing a second urethane material into said cavity in said second mold so as to form said head portion, and so that said second urethane material entirely encases said metallic head weight on said end of said shank portion of said tool.

2. The method of claim 1, wherein said first urethane material has a first, relatively lower durometer and said second urethane material has a second, relatively higher durometer.

3. The method of claim 1, wherein the step of flowing said first urethane material into said first mold comprises:

flowing said first urethane material into said first mold so that said first urethane material forms a band which surrounds said weight member.

4. The method of claim 1, further comprising the step of:

applying a chemical bonding agent to said end of said handle portion before the step of flowing said second urethane material into said second mold, so as to enhance bonding of said urethane materials forming said head and handle portions of said tool.

5. A method for forming a cast urethane, hand-held striking tool having a metallic head weight which is entirely encased within cast urethane material, said method comprising the sequential steps of:

placing said metallic head weight in a first mold cavity;

flowing a first urethane material into a second mold cavity so as to form a shank portion of said tool, said second mold cavity being in fluid communication with said first mold cavity so that said first urethane material flows into engagement with said metallic head weight in said first mold cavity;

at least partially curing said first urethane material so that said first urethane material attaches said metallic head weight on an end of said shank portion;

placing said metallic head weight on said end of said shank portion in a third mold cavity for forming a head portion of said tool, so that said metallic head weight is suspended centrally in said third mold cavity solely by said at least partially cured first urethane material of said shank portion of said tool without any other support;

flowing a second urethane material into said third mold cavity so as to form said head portion of said tool, and so that said second urethane material encases said weight member and said end of said shank portion in said third mold cavity; and fully curing said first and second urethane materials so that said head portion is permanently bonded to said shank portion of said tool.

6. The method of claim 5, wherein said first urethane material has a first, relatively lower durometer so as to provide said handle portion of said tool with relatively greater flexibility, and said second urethane material has a second, relatively higher durometer so as to provide said head portion of said tool with relatively greater rigidity.

7. The method of claim 6, wherein said first urethane material has a durometer of about D50 when cured.

8. The method of claim 7, wherein said second urethane material has a durometer of about D72 when cured.

9. The method of claim 5, wherein said metallic weight member is a generally cylindrical weight member.

10. The method of claim 9, wherein said first mold cavity extends transversely relative to a long axis of said second mold cavity for forming said handle portion of said tool.

11. The method of claim 10, wherein said cylindrical weight member is a solid steel core which is sized to fit closely within said transversely extending first mold cavity.

12. The method of claim 6, further comprising the step of:

providing said third mold cavity with a taper where said head portion of said tool meets said handle portion, so as to provide a smooth transition from lesser to greater rigidity between said handle portion and said head portion of said tool.

13. A method for forming a cast urethane, hand-held striking tool having a metallic weight member in a head portion thereof which is entirely encased within urethane material, said method comprising the sequential steps of:

placing said metallic weight member in a first mold cavity;

flowing a first urethane material into a second mold cavity so as to form a handle portion of said tool, said second mold cavity being in fluid communication with said first cavity so that said first urethane material flows into engagement with said weight member therein;

at least partially curing said first urethane material so that said first urethane material retains said weight member on an end of said handle portion;

placing said weight member on said end of said handle portion in a third mold cavity, so that said weight member is suspended centrally therein solely by said at least partially cured first urethane material without any other support;

said third mold cavity being provided with a taper where said head portion of said tool meets said handle portion, so as to provide a smooth transition from lesser to greater rigidity between said handle portion and said head portion of said tool;

flowing a second urethane material into said third mold cavity so as to form said head portion of said tool, and so that said second urethane material surrounds said weight member and said end of said handle portion in said third mold cavity;

said first urethane material having a first, relatively lower durometer so as to provide said handle portion of said tool with relatively greater flexibility, and said second urethane material having a second, relatively higher durometer so as to provide said head portion of said tool with relatively greater rigidity; and fully curing said first and second urethane materials so that said head portion is permanently bonded to said handle portion of said tool.

* * * * *